United States Patent Office 3,131,167
Patented Apr. 28, 1964

---

3,131,167
LINEAR POLYUREAS FROM A PIPERAZINE 1,4 DI-CARBONYL HALIDE AND A DIAMINE CONTAINING ETHER
Robert J. Cotter, New Brunswick, N.J., assignor to Union Carbide Corporation, a corporation of New York
No Drawing. Filed Dec. 31, 1959, Ser. No. 863,091
14 Claims. (Cl. 260—77.5)

This invention relates to linear polyureas and to a process for the preparation thereof. More particularly, this invention relates to thermoplastic, linear polyureas which are highly crystalline and can be formed into fibers and film material having excellent mechanical strengths.

The linear polyureas of the present invention are prepared by polymerizing a piperazine-1,4-di-carbonyl halide having the general formula:

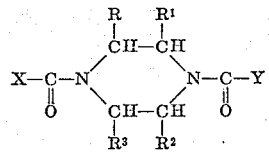

wherein X and Y are halogen atoms, i.e., chlorine, bromine, fluorine, or iodine; R, $R^1$, $R^2$, and $R^3$ are monovalent hydrocarbon radicals or hydrogen, with an organic diamine having the general formula:

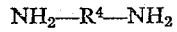

wherein $R^4$ is a divalent hydrocarbon radical for a period of time sufficient to produce a thermoplastic polyurea.

The polymerization reaction which results in the preparation of thermoplastic, linear polyureas in accordance with the present invention can be illustrated by the following equation wherein the reactants are represented by general formula and also wherein the repeating unit of the linear polyurea is also represented by general formula:

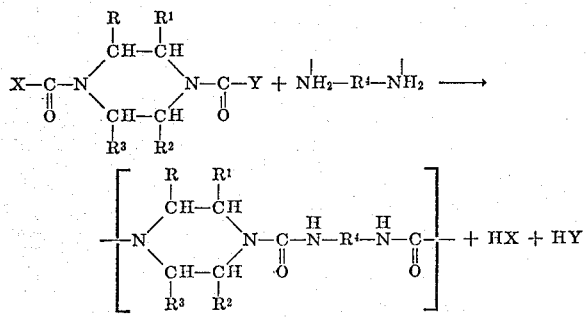

wherein R, $R^1$, $R^2$, $R^3$, $R^4$, X and Y are as previously defined.

Suitable monovalent hydrocarbon radicals for R, $R^1$, $R^2$, and $R^3$ include, among others, the alkyl radicals, such as methyl, ethyl, n-propyl, n-butyl, isobutyl, and the like; cycloalkyl radicals, such as cyclohexyl and the like; alkyl radicals having cycloalkyl substituents, such as cyclohexylmethyl and the like; aromatic hydrocarbon radicals, such as phenyl and the like. Illustrative of suitable compounds are 2-methyl-piperazine-1,4-di-carbonyl chloride, 2,5-dimethyl-piperazine-1,4-di-carbonyl chloride, 2-isobutyl-piperazine-1,4-di-carbonyl chloride, 2-cyclohexyl-piperazine-1,4-di-carbonyl chloride, 2-phenyl-piperazine-1,4-di-carbonyl chloride and the like. Particularly desirable piperazine-1,4-di-carbonyl halides are those wherein R, $R^1$, $R^2$, and $R^3$, which can be the same or different, are hydrogen or monovalent hydrocarbon radicals having a maximum of six carbon atoms.

The term "divalent hydrocarbon radical" as used herein with respect to $R^4$ is intended to encompass unsubstituted and substituted divalent hydrocarbon radicals, unsubstituted and substituted divalent hydrocarbon radicals united by an oxygen atom. Illustrative of suitable radicals are alkylene radicals, such as ethylene, trimethylene, tetramethylene, pentamethylene, hexamethylene, 2-ethyl-hexamethylene, octamethylene, nonamethylene, decamethylene, and the like; the cycloaliphatic radicals, such as 1,4-cyclohexane, 1,3-cyclohexane, 1,2-cyclohexane, and the like; alkoxy and aryloxy substituted alkylene and cycloaliphatic radicals, such as methoxy methylene, ethoxy methylene, ethoxy ethylene, 2-ethoxy-trimethylene, 3-ethoxy-pentamethylene, 1,4-(2 - methoxy)cyclohexane, phenoxy-ethylene, 2-phenoxy-trimethylene, 1,3-(2-phenoxy)cyclohexane, and the like; aralkylene radicals, such as phenyl-ethylene, 2-phenyl-trimethylene, 1-phenyl-pentamethylene, 2-phenyl-decamethylene, and the like; aromatic radicals, such as phenylene, naphthylene, and the like; halogenated aromatic radicals, such as 1,4-(2-chloro)phenylene, 1,4-(2-bromo)phenylene, 1,4-(2-fluoro)phenylene, and the like; alkoxy and aryloxy substituted aromatic radicals, such as 1,4-(2-methoxy)phenylene, 1,4-(2-ethoxy)phenylene, 1,4-(2-n-propoxy)phenylene, 1,4-(2-phenoxy)-phenylene, and the like; alkyl substituted aromatic radicals, such as 1,4-(2-methyl)phenylene, 1,4-(2-ethyl)phenylene, 1,4-(2-n-propyl)phenylene, 1,4-(2-n-dodecyl)phenylene, 1,4-(2-n-dodecyl)phenylene, unsaturated radicals, such as 2-butene-1,4-, 2-pentene-1,5-, 3-methyl-hex-3-ene-1,6-, 2,4-dimethylbut-2-ene-1,4, 4-n-butylhept-4-ene-1,7-, and the like; dimethylether-1,1'-, diethyl ether-2,2'-, di-n-propyl ether-3,3', and the like.

Illustrative of suitable organic diamines having the general formula:

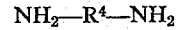

as previously defined are 1,2-diaminoethane, 1,3-diaminopropane, 1,4-diaminobutane, 1,5-diaminopentane, 1,6-diaminohexane, 1,8-diaminooctane, 1,9-diaminononane, 1,10-diaminodecane, 1,4-diaminocyclohexane, 1,4-phenylenediamine, 1,3-phenylene diamine, 1-2-phenylene diamine, 4,4'-diaminodiphenyl methane, 4,4'-diaminodiphenyl, 2-phenoxy-trimethylene diamine, 2-phenyl-decamethylene, bis-(3-aminopropyl) ether, and other like compounds which are free of interfering groups, such as carboxylic acid groups, hydroxyl groups, primary and secondary amino groups, and the like which are capable of reacting with the carbonyl halide groups of the piperazine-1,4-di-carbonyl halides.

Particularly desirable organic diamines for purposes of the present invention are those wherein $R^4$ contains a maximum of 20 carbon atoms and is free of interfering groups. Also mixtures of two different diamines having the same reactivity can be used.

Various amounts of the reactants can be used in the polymerization reaction to produce the linearly polyureas of the present invention. Generally, at least 90 percent of stoichiometric to as much as 100 percent in excess of stoichiometric and higher, if so desired, of the organic diamine is used. It is preferred, however, to use a stoichiometric amount. For purposes of stoichiometric calculations involving the organic diamine and the piperazine-1,4-di-carbonyl halide, one amino group

is deemed to react with one carbonyl halide group:

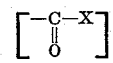

When using less than about 100 percent in excess of stoichiometric of the organic diamine, it is desirable to have present in the polymerization reaction mixture a base which is capable of reacting with the free hydrogen halide present in the reaction mixture to produce the corresponding salt. By the term "free hydrogen halide" is meant the hydrogen halide which is formed in the reaction mixture and which has not been neutralized by the organic diamine. The presence of a base is desirable when using organic diamines in amounts less than 100 percent in excess of stoichiometric in order to insure that the free hydrogen halide present in the reaction mixture will not effectively attack the linear polyurea which is being produced, thus materially decreasing the yield and quality of the polyurea. Suitable bases which will "accept" hydrogen halide include, among others, the water-soluble inorganic bases, such as the alkali metal hydroxides, illustrative of which are sodium hydroxide, lithium hydroxide, potassium hydroxide, and the like; the alkali metal carbonates, such as sodium carbonate, lithium carbonate, potassium carbonate, and the like. Also suitable are the organic bases such as the organic tertiary amines, particularly those having the general formula:

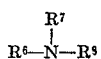

wherein $R^6$, $R^7$, and $R^8$ are monovalent hydrocarbon radicals, free of olefinic and acetylenic unsaturation, such as methyl, ethyl, n-propyl, isopropyl, n-butyl, n-amyl, n-hexyl, 2-ethyl-n-hexyl, n-heptyl, n-octyl, n-nonyl, n-dodecyl, benzyl, 2-phenylethyl, 3-phenyl-n-propyl, 4-phenyl-n-butyl, 5-phenyl-n-amyl, 2-phenyl-n-hexyl, 3-phenyl-n-heptyl, phenyl, o-methylphenyl, p-ethylphenyl, p-amylphenyl, o-n-butylphenyl, and the like. Specific compounds include, among others, trimethylamine, triethylamine, tri-n-propylamine, tri-n-butylamine, tri-n-dodecylamine, tri-n-decosylamine, tri-(2-phenylethyl)-amine, tri-benzylamine, dimethyl-n-propylamine, diethyl-n-propylamine, methylethyl-n-propylamine, N,N-dimethylaniline, and the like. Particularly effective organic tertiary amines for purposes of this invention are those wherein $R^6$, $R^7$, and $R^8$ are either alkyl or aralkyl radicals, each having a maximum of 12 carbon atoms.

The actual amount of base used will depend upon the amount of the organic diamine present in the reaction mixture. Sufficient base is used to effect substantially complete neutralization of the free hydrogen halide present in the mixture. When less than 100 percent in excess of stoichiometric of the organic diamine is used, the base is used in stoichiometric amounts based on the amount of free hydrogen halide in the reaction mixture, so that the free hydrogen halide is neutralized, forming the corresponding salt.

In conducting the polymerization reaction, it is also desirable to have present in the reaction mixture sufficient water to effectively remove from the organic reactants salt formed on neutralization of the hydrogen halide. The water, in removing the salt from the organic reactants, facilitates recovery of the linear polyurea which is formed. The actual amount of water used can vary over a wide range of about 5 to 25 times by weight based on the combined weight of the organic diamine and the "hydrogen halide accepting" base.

It is also preferred to conduct the polymerization reaction in the presence of an organic diluent which is a solvent for the piperazine-1,4-di-carbonyl halide and the organic diamine and is non-reactive with respect to the starting materials and the linear polyurea which is formed. The use of an organic diluent also provides a medium in which the starting materials are brought into intimate contact and also facilitates removal of the linear polyurea from the reaction medium.

The actual organic diluent used will depend upon the reactants and the temperature at which the polymerization reaction is to be conducted. The organic diluent should have a boiling point equal to or above the polymerization reaction temperature. It is customary to use the organic diluents in amounts of at least about 200 percent by weight based on the weight of the starting materials. The upper limit with respect to the amount of organic diluent used will depend upon the rate at which it is desired to conduct the reaction. The more dilute the reaction mixture, the slower the rate of reaction. From a practical standpoint, the organic diluent is used in amounts up to about 500 percent by weight based on the weight of the starting materials.

Suitable organic diluents include, among others, the aromatic hydrocarbons, such as benzene, xylene, and the like; the halogenated aromatic hydrocarbons, such as chlorobenzene and the like; cycloaliphatic hydrocarbons, such as cyclohexane, n-propyl cyclohexane, and the like; alkoxy substituted aromatic hydrocarbons, such as methoxybenzene and the like; aliphatic hydrocarbons, such as n-hexane, n-heptane, and the like; halogenated aliphatic hydrocarbons, such as dichloromethane and the like; ethers, such as diethyl ether, diethyl ether of ethylene glycol, diethyl ether of 1,3-propylene glycol, dioxane, and the like; also suitable are petroleum ether, tetrahydrofuran, and the like. Mixtures of organic diluents can also be used.

The polymerization reaction is conducted, generally, under atmospheric pressures, although if desired, it can be conducted under subatmospheric or superatmospheric pressure.

The temperature at which the polymerization reaction can be conducted can vary over a wide range. Temperatures in the range of about 0° C. to about 150° C. are satisfactory. At temperatures lower than about 0° C., the polymerization reaction proceeds too slowly to be practical. A temperature in the range of about 25° C. to about 75° C. is most preferred.

The process of polymerizing a piperazine-1,4-bis-carbonyl halide with an organic diamine in accordance with the present invention is conducted by simply admixing the starting materials and stirring the mixture at the desired temperature for a period of time sufficient to produce a thermoplastic polyurea. Usually the polymerization reaction proceeds substantially to completion in about one hour. Generally the piperazine-1,4-di-carbonyl halide is dissolved in an organic diluent and added to an aqueous mixture of an organic diamine and a "hydrogen halide accepting" base.

Recovery of the linear polyurea from the reaction mixture can be accomplished by any one of a number of convenient methods. For example, in those instances wherein the polyurea is soluble in the organic diluent used in the polymerization reaction, the reaction mixture can be poured into a solvent in which the linear polyurea is insoluble and the organic diluent is soluble with the result that the polyurea will precipitate out. The linear polyurea can then be recovered by a simple filtration operation and then, if desired, washed with various liquids such as water and the like.

The piperazine-1,4-di-carbonyl halides which can be polymerized in accordance with the present invention can be obtained by reacting a piperazine with carbonyl halides such as carbonyl chloride, carbonyl fluoride, carbonyl bromide, carbonyl iodide, and the like in the presence of an inorganic base such as sodium hydroxide, sodium carbonate, and the like or an organic base, such as triethylamine and the like. Preparation of piperazine-1,4-di-carbonyl halides is further described in Example 1 of the specification and also in United States Patent 2,731,445 to E. L. Wittbecker, issued Jan. 17, 1956, which is incorporated herein by reference.

In the examples which follow, which are illustrative and not intended to limit the scope of the invention in any manner, the procedure used to determine the reduced viscosity values was as follows. A 0.2 gram sample of the linear polyurea was weighed into a volumetric flask containing 100 ml. of a solvent. The contents of the flask were stirred until solution of the polyurea was complete. The solution was then filtered through a sintered glass funnel and the viscosity of a 3 ml. sample determined on a Cannon viscometer at about 25° C. Reduced viscosity was determined by the use of the equation:

$$RV = \frac{ts - to}{cto}$$

wherein:

*to* is the efflux time for the solvent
*ts* is the efflux time for the polyurea solution
*c* is the concentration of the solution in terms of grams of polyurea per 100 ml. of solution

EXAMPLE 1

*Polymerization of Piperazine-1,4-Di-Carbonyl Chloride With Hexamethylene Diamine*

(*a*) *Preparation of piperazine-1,4-di-carbonyl chloride.*—Into a Pyrex glass flask equipped with a stirrer, dropping funnel, thermometer, and containing a solution of 150 grams (1.5 moles) of phosgene in 900 ml. of dichloromethane, there was added dropwise a solution of 51.6 grams (0.6 mole) of piperazine and 122 grams (1.21 moles) of triethylamine in 200 ml. of dichloromethane, while the contents of the flask were maintained at 0° C. to 5° C. After the addition was completed, the mixture was allowed to warm to room temperature, about 25° C., and was then filtered. The filtrate was poured into a separatory funnel and washed three times with 200 ml. portions of ice water. The organic layer was separated from the aqueous layers and dried over calcium chloride. The organic solution was then heated at 45° C. and under atmospheric pressure until the dichloromethane was distilled off, leaving behind a solid residue. The residue was then recrystallized from toluene yielding 60 grams (47% of theoretical) of piperazine-1,4-di-carbonyl chloride having a melting point of 151°C.–154° C.

(*b*) *Polymerization of piperazine-1,4-di-carbonyl chloride with hexamethylene diamine.*—A solution of 1.16 grams (0.01 mole) of hexamethylene diamine and 2.23 grams (0.021 mole) of sodium bicarbonate in 15 ml. of water was added to a solution of 2.11 grams (0.01 mole) of piperazine-1,4-di-carbonyl chloride in 35 ml. of tetrahydrofuran which was contained in a Pyrex glass flask equipped with a thermometer, dropping funnel, reflux condenser, and stirrer. The mixture was heated under reflux for 1½ hours while being continuously stirred. At the end of 1½ hours the mixture was poured into a Waring Blendor containing 300 ml. of water with the result that the thermoplastic polyurea which had formed precipitated out of solution. The polyurea was washed three additional times in the Waring Blendor using 300 ml. portions of water and then dried by heating at 100° C. for 24 hours under a reduced pressure of 5 mm. Hg. 2.1 grams of the thermoplastic polyurea were recovered, which corresponded to a yield of 83 percent (based on the theoretical yield).

The polyurea had a reduced viscosity of 0.85 in p-chlorophenol, a melting point of 230° C. and was highly crystalline as determined by X-ray analysis.

EXAMPLE 2

*Polymerization of Piperazine-1,4-Di-Carbonyl Chloride With Decamethylene Diamine*

Into a Pyrex glass flask equipped with a stirrer, dropping funnel, thermometer and reflux condenser and containing 2.11 grams (0.01 mole) of piperazine-1,4-di-carbonyl chloride in 35 ml. of tetrahydrofuran, there was added to solution of 1.72 grams (0.01 mole) of decamethylene diamine and 2.23 grams (0.021 mole) of sodium carbonate in 15 ml. of water. The mixture was heated under reflux for 1½ hours while being continuously stirred. At the end of 1½ hours, the mixture was poured into a Waring Blendor containing 300 ml. of water with the result that the thermoplastic polyurea which had formed precipitated out of solution. The polyurea was washed three additional times in the Waring Blendor using 300 ml. portions of water and then dried by heating at 100° C. for 24 hours under a reduced pressure of 5 mm. Hg.

The polyurea had a reduced viscosity of 1.68 in p-chlorophenol, a melting point of 215° C. and was highly crystalline as determined by X-ray analysis.

The thermoplastic polyurea was formed into film material and the properties of the film material determined. The thermoplastic polyurea was formed into film material having a thickness a 5 mils. by pressing in an electric laboratory press between aluminum foil at 400° F. and a pressure of 500 p.s.i. for five minutes. Samples of the film were oriented by stretching the film using conventional apparatus so that a 200 percent stretch was effected at 95° C.–100° C. The percent stretch was determined by means of the equation:

$$\text{Percent stretch} = \frac{100 \times \text{area aftr stretching} - \text{area before stretching}}{\text{Area before stretching}}$$

| | Film | |
|---|---|---|
| | Un-oriented | Oriented |
| Tensile strength, p.s.i., ASTM-D-882-56T | 6,750 | 31,300 |
| Tensile modulus, p.s.i., ASTM-D-882-56T | 210,900 | 326,000 |
| Percent Elongation | 57 | 24 |

The following table lists a number of thermoplastic polyureas which have been prepared using the same procedure as described in Example 1 and also using the various reactants in the molar amounts noted in that example, wherein in the repeating unit:

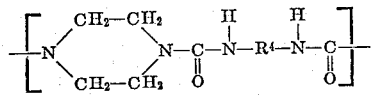

$R^4$ is indicated in the table.

TABLE I

| $R^4$ | Reduced Viscosity | Melting Point, °C. |
|---|---|---|
| $-(CH_2)_2-$ | 0.43 | 250 |
| $-(CH_2)_3-$ | 0.75 | 285 |
| $-(CH_2)_7-$ | 0.56 | 220 |
| $-(CH_2)_9-$ | 0.95 | 215 |
| $-(CH_2)_3-O-(CH_2)_3-$ | 0.57 | 200 |

The thermoplastic, linear polyureas of the present invention can be molded or otherwise formed into various shaped articles, for example film material which can be used as wrapping material and the like. In addition, the thermoplastic, linear polyureas can be extruded into fibers having excellent mechanical strengths.

What is claimed is:

1. Process for the preparation of a thermoplastic, crystalline, linear polyurea which consists essentially of reacting, in a medium containing an organic diluent and water, at a temperature of from about 0° C. to about 150° C., a piperazine-1,4-di-carbonyl halide having the general formula:

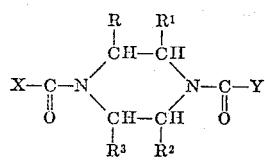

wherein X and Y are halogen atoms, R, R¹, R², and R³ are selected from the group consisting of hydrogen and monovalent hydrocarbon radicals with an organic diamine having the general formula:

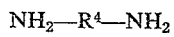

wherein R⁴ is a member selected from the group consisting of divalent hydrocarbon radicals and divalent hydrocarbon radicals united by an oxygen atom, for a period of time sufficient to produce a thermoplastic polyurea, said organic diamine being used in an amount of at least about 100 percent in excess of stoichiometric.

2. Process for the preparation of a thermoplastic, crystalline, linear polyurea which consists essentially of admixing in a medium containing water and an organic diluent, a piperazine-1,4-di-carbonyl halide having the general formula:

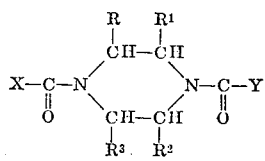

wherein X and Y are halogen atoms, R, R¹, R², and R³ are selected from the group consisting of hydrogen and monovalent hydrocarbon radicals, an organic diamine having the general formula:

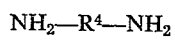

wherein R⁴ is a member selected from the group consisting of divalent hydrocarbon radicals and divalent hydrocarbon radicals united by an oxygen atom, said organic diamine being present in an amount of between about 90 percent of stoichiometric to about 100 percent in excess of stoichiometric, and a base which is capable of reacting with the free hydrogen halide present in the reaction mixture to produce the corresponding salt, said base being present in an amount sufficient to neutralize substantially all of the free hydrogen halide present in said mixture for a period of time sufficient to produce a thermoplastic polyurea.

3. Process as defined in claim 2 wherein the reaction is conducted at a temperature of from about 25° C. to about 75°C.

4. Process for the preparation of a thermoplastic, crystalline, linear polyurea which consists essentially of reacting, at a temperature of from about 0° C. to about 150° C. and in an aqueous medium, a mixture containing an organic diluent, a piperazine-1,4-di-carbonyl halide having the general formula:

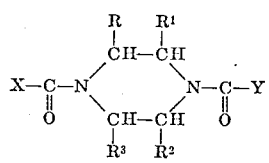

wherein X and Y are halogen atoms, R, R¹, R²· and R³ are selected from the group consisting of hydrogen and monovalent hydrocarbon radicals, an organic diamine having the general formula:

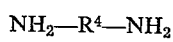

wherein R⁴ is a member selected from the group consisting of divalent hydrocarbon radicals and divalent hydrocarbon radicals united by an oxygen atom, said organic diamine being present in an amount of at least about 90 percent of stoichiometric, and a base which is capable of reacting with the free hydrogen halide present in the reaction mixture to produce the corresponding salt, said base being present in an amount sufficient to neutralize substantially all of the free hydrogen halide present in said mixture, for a period of time sufficient to produce a thermoplastic polyurea.

5. Process as defined in claim 4 wherein the said base is a member selected from the group consisting of alkali metal hydroxides, alkali metal carbonates and organic tertiary amines.

6. Process as defined in claim 4 wherein the said organic diamine is present in about stoichiometric amounts, the said base is present in about stoichiometric amounts and is a member selected from the group consisting of alkali metal hydroxides, alkali metal carbonates and organic tertiary amines.

7. A thermoplastic, crystalline, linear polyurea consisting essentially of a plurality of repeating units which have the general formula:

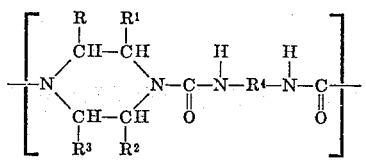

wherein R, R¹, R², and R³ are selected from the group consisting of hydrogen and monovalent hydrocarbon radicals and R⁴ is made up of divalent hydrocarbon radicals united by an oxygen atom wherein said oxygen atom forms an ether linkage within the repeating unit of said polyurea.

8. A thermoplastic, crystalline, linear polyurea as defined in claim 7 wherein R, R¹, R², and R³ are hydrogen.

9. A thermoplastic, crystalline, linear polyurea as defined in claim 7 wherein R⁴ is diethyl ether-2,2'-.

10. A thermoplastic, crystalline, linear polyurea as defined in claim 7 wherein R, R¹, R² and R³ are monovalent hydrocarbon radicals having a maximum of six carbon atoms.

11. A thermoplastic, crystalline, linear polyurea consisting essentially of a plurality of repeating units which have the general formula:

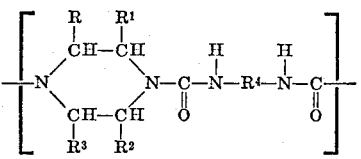

wherein R, R¹, R² and R³ are selected from the group consisting of hydrogen and monovalent hydrocarbon radicals and R⁴ is made up of divalent hydrocarbon radicals united by an oxygen atom wherein said oxygen atom forms an ether linkage within the repeating unit of said polyurea.

12. A thermoplastic, crystalline, linear polyurea as defined in claim 11 wherein R, R¹, R² and R³ are hydrogen.

13. A thermoplastic, crystalline, linear polyurea as defined in claim 11 wherein R⁴ is di-n-propyl ether-3,3'-.

14. A thermoplastic, crystalline, linear polyurea as defined in claim 7 wherein R⁴ is di-n-propyl ether-3,3'-.

References Cited in the file of this patent

UNITED STATES PATENTS

| | | |
|---|---|---|
| 2,265,416 | Bestian | Dec. 9, 1941 |
| 2,643,255 | Morren | June 23, 1953 |
| 2,708,617 | Magat et al. | May 17, 1955 |
| 2,813,775 | Steuber | Nov. 19, 1957 |
| 2,929,803 | Frazer et al. | Mar. 22, 1960 |
| 2,975,157 | Katz | Mar. 14, 1961 |

OTHER REFERENCES

Lyman et al.: Journal Polymer Science, vol. 40, pages 407–418, November 1959.